July 5, 1932. D. S. BARROWS 1,866,341
CUSHIONING MECHANISM
Filed Jan. 24, 1929
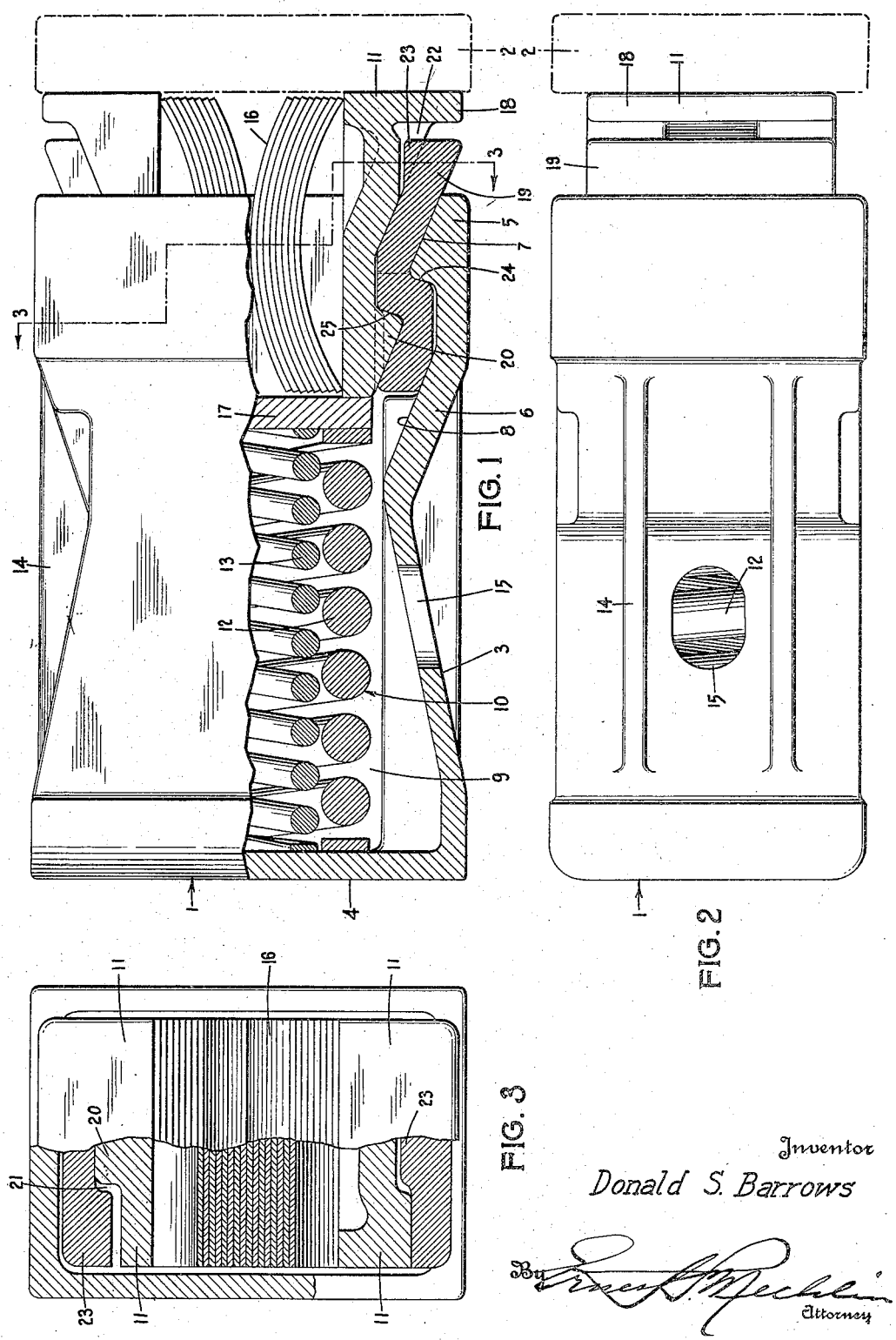
Inventor
Donald S. Barrows Patented July 5, 1932

1,866,341

UNITED STATES PATENT OFFICE

DONALD S. BARROWS, OF ROCHESTER, NEW YORK, ASSIGNOR TO THE GOULD COUPLER COMPANY, OF NEW YORK, N. Y., A CORPORATION OF MARYLAND

CUSHIONING MECHANISM

Application filed January 24, 1929. Serial No. 334,835.

This invention relates to cushioning mechanism and more particularly to a friction draft gear adapted for application to railway rolling stock for cushioning draft and buffing forces delivered thereto.

The principal object of my invention, generally considered, is to provide a friction draft gear adapted for application to railway rolling stock and designed so that an increase in capacity is effected and smoothness of operation and longevity of service are retained.

Another object of my invention is the provision of a friction draft gear comprising a casing formed with a plurality of sets of inclined friction surfaces adjacent one end thereof, said casing receiving friction wedge blocks which are slidable longitudinally with respect thereto and are formed with cooperating friction surfaces thereon, provision being made for reducing the wear on the casing, if desired, by positioning wedge shoes or intermediate friction elements between said casing and blocks, said shoes being formed with friction surfaces engaging the friction surfaces on the casing and wedge blocks respectively, and preferably having relative movement with respect to said casing and wedge blocks, said blocks being preferably provided with laterally extending lips desirably overlying the ends of the shoes for limiting relative movement between the blocks and shoes while at the same time providing increased bearing area on the ends of said blocks for cooperation with an associated follower.

A further object of my invention is the provision of a friction draft gear especially adapted for application to railway cars and comprising a friction barrel integrally formed with a double bell mouth for increasing the frictional area with respect to associated friction wedges, whereby the inclination of said friction surfaces may be increased for increasing the capacity of the gear, said wedges being preferably formed with laterally extending lips on the large ends thereof for increasing the bearing area with respect to an associated follower.

A still further object of my invention is to provide a frictional cushioning mechanism especially adapted to use as a railway draft gear and comprising a friction casing closed at one end and open at the other, said open end being provided with a plurality of sets of inclined friction surfaces, said casing containing resilient means resisting inward movement of associated wedge blocks, separate resilient means uring said wedge blocks toward the friction surfaces adjacent the mouth of the casing, and friction shoes disposed between the friction surfaces on the casing and wedge blocks, the inclination of the friction surfaces on the wedge blocks and the cooperating surfaces on the shoes being preferably greater than the inclination of the friction surfaces on the casing and the cooperating surfaces on the shoes, whereby improvement in operation of the gear is effected, said blocks and shoes being formed with interlocking ribs for guiding said members for relative longitudinal movement, the ribs on one member fitting in corresponding grooves in the other member, all members being preferably formed with longitudinally spaced ribs and grooves so that the rib on one member fits a corresponding groove in the other, which other is also provided with a rib fitting in a corresponding groove in the first member.

Other objects and advantages of the invention relating to the particular arrangement and construction of the various parts will become apparent as the description proceeds.

Referring to the drawing illustrating my invention, the scope whereof is defined by the appended claims.

Figure 1 is a vertical central longitudinal sectional view of the cushioning mechanism embodying my invention.

Figure 2 is a plan of the mechanism illustrated in Figure 1.

Figure 3 is a transverse sectional view on the line 3—3 of Figure 1 looking in the direction of the arrows.

Referring to the drawing in detail, like parts being designated by like reference characters, there is shown a cushioning mechanism 1 especially adapted for use as a friction draft gear for railway rolling stock and designed so that it will fit in a draft gear pocket of normal size. In Figures 1 and 2, the gear is shown associated with a rear follower 2 and is particularly adapted for use with the usual type of Farlow attachments embodying a horizontal yoke, a front follower, a key supporting said front follower, and connecting the same with the draft sills, and another key serving for connecting the yoke with the coupler. The aforementioned parts in addition to the draft gear and rear follower are not shown because they are parts of a usual form of draft rigging with which my draft gear may be used, although, it will be understood, that my draft gear is adapted for use with other forms of draft rigging or positioned with its long transverse axis horizontal rather than vertical, if desired.

The embodiment illustrated comprises a friction casing, housing or barrel 3 closed at one end by a wall or web 4, which end is illustrated as the front end, although as is obvious, my gear is adapted to be used when turned end to end, if desired. The open end of the gear is preferably formed with flaring or inclined walls 5 and 6, said walls providing a plurality or pair of sets of inclined friction surfaces 7 and 8 respectively. On account of this construction, the casing 3 is formed with, what is in effect, a double bell mouth which is preferably larger than the remaining portion of the casing, which remaining portion is preferably decreased to a portion 9 substantially square in section and which serves for containing the resilient means 10 which resists inward movement of the friction wedge blocks 11. In the present embodiment, the resilient means 10 is shown as comprising a pair of coil springs 12 and 13, the outer spring 12 being preferably of greater capacity than the inner spring 13 and said springs being wound in opposite directions so that interference therebetween is minimized.

The closed end 4 of the casing 3 is preferably enlarged to the same size as the open end to provide a firm bearing with respect to the adjacent element of the draft rigging, and longitudinal stiffening ribs 14 are preferably provided between the double bell-shaped end and the closed end of the casing, as shown most clearly in Figure 2. Between the ribs 14, apertures 15 are preferably provided which serve to lighten the weight of the barrel 3, to permit the elimination of dirt therefrom, and provide openings for inspection of the springs 12 and 13.

The wedges or wedge blocks 11 are urged apart and pressed toward the friction surfaces 7 and 8 on the casing 3 by suitable resilient means which, in the present instance, comprises a pair of sets of spring plates 16 preferably curved longitudinally and disposed with their convex sides toward each other. A plate or intermediate follower 17 is desirably positioned between the inner ends of the wedge blocks 11 and the outer ends of the springs 12 and 13, said follower 17 thereby providing a firm bearing for the outer ends of the coil springs and serving to limit longitudinal movement of the plate springs 16. The blocks 11 are desirably provided with outwardly or transversely extending lips or flanges 18 preferably overlying the ends of the double bell mouth portion 5 of the casing and intermediate friction elements or shoes 19, is used, and serving to increase the bearing area at the ends of said blocks for cooperation with the associated follower 2. It will also be observed that these lips or flanges 18 serve to limit the relative inward movement of the blocks with respect to the associated shoes 19. Said blocks are also preferably formed with ribs or longitudinally disposed flanges 20 fitting in corresponding grooves or notches 21 in the associated frictional portions or plates 19, if used, and serving to guide the blocks for longitudinal relative movement into and out of the casing in addition to that provided by the side walls of said casing. Said blocks are also preferably provided with grooves or notches 22 longitudinally spaced with respect to the ribs or flanges 20 and normally receiving cooperating ribs or flanges 23 formed on the cooperating friction elements or shoes 19, if used. Said interlocking between the ribs and notches on the cooperating elements serves to properly align them for longitudinal relative movement, and in addition stiffens the construction by providing what amount to embossments or corrugations therein.

Preferably disposed between the friction surfaces 7 and 8 on the casing and the corresponding surfaces on the wedge blocks 11 are intermediate friction elements or wedge shoes 19, which shoes are preferably slightly shorter than the friction blocks 11 and are so arranged that when in released position, as illustrated, the inner ends of the wedge blocks and shoes are substantially in alignment while the outer ends of the wedge blocks 11 extend a substantial distance beyond the ends of the shoes 19. The outer faces of each wedge shoe 19 provides a plurality of similarly inclined friction surfaces engaging the corresponding friction surfaces 7 and 8 of the casing 3. On account of the friction surfaces 7 and 8 being stepped rather than continuous, shoulder portions 24 are formed on the friction casing 3, which interlock in corresponding notches in the shoes 19 to limit outward movement of said shoes during normal operation of the gear. A similar interlocking engagement is effected between the shoulder portions 25 on the wedge blocks and corresponding depressions or notches in the inner faces of the shoes 19, whereby outward movement of said wedge blocks during normal operation is limited.

The inclination of the friction surfaces on the wedge blocks 11 and the engaging surfaces on the shoes 19 is preferably, though not necessarily, slightly greater than that of the inclined friction surfaces 7 and 8 on the casing and the engaging surfaces on the shoes 19. For example, the inclination of these friction surfaces on the shoes may be 23 degrees with respect to the longitudinal center line of the gear while the inclination of the friction surfaces on the casing need only be 22 degrees. The reason for this construction is to improve the opertion of the gear and, particularly, the release thereof, it being apparent that the greater the inclination of the friction surfaces, the easier the gear will release and the greater the capacity thereof. With the construction heretofore described, the release of the gear is effected first by outward movement of the wedge blocks 11 with respect to the shoes 19, and upon engagement of the shoulders 25 thereon with the corresponding portions on the shoes, said shoes will finally be drawn to released position.

The operation of my cushioning mechanism or draft gear is as follows. When force is applied thereto, for example, either buffing or draft force, relative movement is effected between the casing 3 and the follower 2, thereby first causing the wedge blocks 11 to move inwardly of the casing 3, on account of the tendency of the shoes 19 to stay in place with respect to the casing, straightening the springs 16 and compressing the springs 12 and 13, as will be understood. When the wedges 11 have moved until the flanges or lips 18 thereon engage the ends of the shoes 19, said shoes then move with the wedges 11 until the gear is fully compressed. When the gear is released, the wedges 11 first move outwardly until the shoes 19 are picked up, and then wedges and shoes move together.

From the foregoing disclosure, it will be apparent that I have devised a cushioning mechanism particularly adapted as a railway friction draft gear and so constructed that increase in capacity may be effected by increasing the inclination of the friction surfaces, sufficient area for said surfaces being provided by a plurality of sets thereof. The friction area between the large ends of the wedges and the associated follower has been increased by providing outstanding or laterally disposed lips or flanges which also overlie the ends of the shoes and serve to limit longitudinal movement between said shoes and wedges. Said friction shoes and wedges are preferably formed with interlocking flanges or ribs and complementary grooves or notches, whereby said elements are maintained properly aligned during normal operation, as well as strengthened by the corrugating or embossing effect of such construction.

It will be seen that wear on the casing is reduced by the provision of the shoes, because no motion between the shoes and casing is effected upon initial movement of the gear until a substantial compression thereof has been effected. In this way, the casing is only subjected to wear when severe shocks are received by the gear and no wear is effected by small normal movement of the gear, the main wear being therefore between the wedge blocks and shoes, which members are relatively small and less expensive to replace. By providing the inclination of the friction surfaces on the wedge blocks steeper than that on the casing release movement of said wedge blocks is first effected and said movement is positive in its action, thereby obviating sticking or other improper gear action. Although a preferred embodiment of my invention is illustrated, it will be understood that modifications may be made therein within the spirit and scope of the appended claims.

Having now described my invention, I claim:

1. In cushioning mechanism, in combination, a casing formed with a plurality of sets of inclined friction surfaces, friction wedge blocks slidable longitudinally in said casing and formed with a plurality of sets of inclined friction surfaces, wedge shoes disposed between the friction surfaces on the casing and those on the blocks and formed with friction surfaces complementary to and engaging those on the casing and wedge blocks respectively, a follower engaging the ends of said wedge blocks, lips on said wedge blocks extending outwardly from the ends thereof for increasing the bearing area with respect to said follower, resilient means resisting movement of the wedge blocks inwardly of the casing, and resilient means disposed between the wedge blocks to press the same toward the shoes and casing.

2. In cushioning mechanism, in combination, a casing formed with a plurality of sets of inclined friction surfaces, friction wedge blocks slidable longitudinally with respect to said casing, and each formed with a plurality of inclined friction surfaces, wedge shoes disposed between the friction surfaces on the casing and those on the blocks and formed with friction surfaces complementary to and engaging those on the casing and wedge blocks respectively, the inclination of the friction surfaces on the wedge blocks being greater than that of the friction surfaces on the casing, said blocks and shoes having complementary shoulders limiting movement of the blocks outwardly of the casing, said shoes and casing having complementary shoulders limiting movement of the shoes outwardly of the casing, resilient means resisting movement of the wedge blocks inwardly of the casing, and resilient means disposed between the wedge blocks to force them toward the shoes and casing.

3. In cushioning mechanism, in combination, a casing formed with a double bell mouth providing a plurality of sets of friction surfaces, friction wedge blocks movable longitudinally with respect to said casing and formed with friction surfaces spaced from those on the casing, intermediate friction elements disposed between the friction surfaces on the casing and wedge blocks and formed with friction surfaces complementary to and engaging those on the casing and wedge blocks, said blocks being adapted to have substantial sliding movement on the intermediate friction elements and the latter being adapted to have substantial sliding movement on the casing, resilient means directly opposing movement of the wedge blocks inwardly of the casing, and resilient means disposed between the wedge blocks to press the same toward the intermediate friction elements and casing.

4. In cushioning mechanism, in combination, a casing formed with a double bell mouth providing a plurality of sets of friction surfaces, friction wedges slidable longitudinally with respect to said casing and each formed with a plurality of friction surfaces, intermediate friction elements disposed between the friction surfaces on the casing and those on the wedges and formed with friction surfaces complementary to and engaging those on the casing and wedges respectively, the friction surfaces on the wedges being inclined with respect to the axis of the mechanism to a greater degree than the friction surfaces on the casing, said wedges being formed with interlocking ribs extending into corresponding grooves in said intermediate friction elements, and said intermediate friction elements being formed with ribs longitudinally spaced from said grooves and fitting into corresponding grooves in the wedges for aligning said wedges and intermediate friction elements for longitudinal movement with respect to the casing, resilient means resisting movement of the wedges inwardly of the casing, and resilient means disposed between said wedges to press the same outwardly toward the intermediate elements and casing.

5. In cushioning mechanism, in combination, a casing formed with a pair of sets of inclined friction surfaces, wedge blocks slidable longitudinally with respect to said casing and formed with a corresponding pair of sets of inclined surfaces, shoes disposed between the friction surfaces on the casing and blocks and formed with friction surfaces complementary to and normally engaging those on the casing and wedge blocks respectively, outwardly extending lips on said wedge blocks overlying the ends of the shoes for limiting relative movement therebetween, coil springs means resisting movement of the wedge blocks inwardly of the casing and leaf spring means disposed between the wedge blocks and acting to force the same toward the shoes and casing.

6. In cushioning mechanism, in combination, a casing formed with a pair of sets of inclined friction surfaces, friction wedge blocks movable longitudinally with respect to said casing and each formed with a pair of inclined friction surfaces, shoes disposed between the friction surfaces on the casing and those on the blocks and formed with friction surfaces complementary to and engaging those on the casing and blocks respectively, the friction surfaces on the blocks being disposed at a greater angle to the axis of the mechanism than the friction surfaces on the casing, said blocks being formed with outwardly extending lips overlying the ends of the shoes and adapted to engage said shoes for limiting relative movement therebetween, thereby increasing the movement of the shoes with respect to the casing upon compression of the mechanism an amount corresponding with the thickness of said lips, coil springs resisting inward movement of the wedge blocks with respect to the casing and leaf spring means positioned between the wedge blocks to urge the same toward the shoes and casing.

7. In cushioning mechanism, in combination, a friction barrel formed with a plurality of sets of inclined friction surfaces, wedge blocks slidable longitudinally with respect to said barrel and formed with a plurality of sets of similarly inclined friction surfaces, a follower engaging the large ends of said wedge blocks, shoes disposed between said friction surfaces on the barrel and those on the blocks and formed with friction surfaces complementary to and engaging those on the barrel and blocks respectively, a greater than usual frictional area being provided by the plurality of sets of inclined friction surfaces on the friction elements, said blocks being formed with lateral extensions on their large ends for increasing the bearing area with respect to said follower, resilient means positioned in said barrel and engaging the wedge blocks to resist inward movement thereof, and resilient means positioned between the wedge blocks to urge the same toward the shoes and the friction surfaces on the barrel.

8. In cushioning mechanism, in combination, a barrel formed with a plurality of sets of inclined friction surfaces adjacent the mouth thereof, friction wedge blocks slidable longitudinally with respect to said barrel and each formed with a corresponding number of inclined friction surfaces, wedge shoes disposed between the friction surfaces on the barrel and those on the blocks and formed with friction surfaces complementary to and engaging those on the barrel and wedge blocks respectively, the inclination of the friction surfaces on the wedge blocks being greater than that of the friction surfaces on the barrel to facilitate release of the mechanism, means limiting sliding movement of the blocks on the shoes to cause the coextensive movement of said blocks and shoes during a portion of the operative movement of said mechanism, both on compression and release, resilient means resisting movement of the wedge blocks inwardly of the barrel, and resilient means disposed between the wedge blocks to press the same toward the shoes and the friction surfaces on the barrel.

9. In cushioning mechanism, in combination, a casing integrally formed with a plurality of sets of inclined friction surfaces, friction wedge blocks slidable longitudinally in said casing and formed with a plurality of sets of inclined friction surfaces, a follower normally engaging the large ends of said blocks, said ends being formed with laterally extending flanges for increasing the bearing area with respect to said follower, resilient means resisting movement of the wedge blocks inwardly of the casing, and resilient means disposed between the wedge blocks to press the same toward the casing.

10. In cushioning mechanism, in combination, a housing provided with a pair of sets of inclined friction surfaces, friction wedge blocks movable longitudinally in said housing and having a pair of sets of inclined friction surfaces, wedge shoes positioned between the friction surfaces on the housing and those on the blocks and formed with friction surfaces corresponding to and engaging those on the housing and wedge blocks respectively, said wedge blocks being provided with flanges extending outwardly from the ends over the ends of the shoes for increasing the wedge block end area, spring means resisting movements of the wedge blocks inwardly of the housing, and additional spring means disposed between the wedge blocks to urge them toward the shoes and housing.

11. In cushioning mechanism, in combination, a housing having a double bell mouth providing a pair of sets of friction surfaces, friction wedges slidable longitudinally with respect to said housing and each formed with a pair of friction surfaces, intermediate friction elements disposed between the friction surfaces on the housing and wedges and having friction surfaces complementary to and normally engaging those on said housing and wedges, the friction surfaces on the wedges being disposed at a greater inclination with respect to the axis of the housing than the friction surfaces on said housing, resilient means directly resisting movement of the wedges inwardly of the housing and other resilient means disposed between said wedges to urge the same outwardly toward the intermediate elements and housing.

12. In cushioning mechanism, in combination, a housing having a pair of sets of inclined friction surfaces, wedge blocks slidable longitudinally with respect to said housing and formed with a correspondingly inclined pair of sets of friction surfaces, friction shoes disposed between the corresponding surfaces on the housing and blocks and having friction surfaces complementary to and normally engaging those on the housing and blocks respectively, said blocks having lips extending outwardly and overlying the ends of the shoes for limiting relative movement therebetween, and spring means for urging the blocks and shoes toward the housing and effecting release of the mechanism.

13. In cushioning mechanism, in combination, a friction housing provided with a plurality of sets of inclined friction surfaces, wedge blocks slidable longitudinally into and out of said housing and formed with a plurality of sets of inclined friction surfaces, shoes disposed between said friction surfaces on the housing and those on the blocks and having surfaces complementary to and engaging those on said housing and blocks respectively, said blocks having lateral extensions on their outer ends for increasing the end area thereof, resilient means disposed in said housing and engaging the wedge blocks to resist inward movement thereof, and resilient means disposed between the wedge blocks for urging them into frictional engagement with the associated parts.

14. In cushioning mechanism, in combination, a housing formed with a plurality of sets of inclined friction surfaces, wedge blocks slidable longitudinally in said housing and having a plurality of sets of inclined friction surfaces, the ends of said blocks extending out of said housing having laterally extending flanges for increasing the end area thereof, resilient means resisting movement of the wedge block inwardly of the housing, and resilient means positioned between the wedge blocks to press them toward the housing.

In testimony whereof I affix my signature.

DONALD S. BARROWS.